219-121

1/15/80 OR 4,184,062

United States Patent [19] [11] 4,184,062

Schmidt [45] Jan. 15, 1980

[54] LASER RESISTANCE TRIMMER

[76] Inventor: Robert A. Schmidt, 325 Third Ave., Indialantic, Fla. 32903

[21] Appl. No.: 845,356

[22] Filed: Oct. 25, 1977

[51] Int. Cl.[2] .............................................. B23K 9/00

[52] U.S. Cl. .................................. 219/121 L; 29/593; 29/620; 219/121 LM

[58] Field of Search .... 219/121 L, 121 LM, 121 FM; 29/593, 620; 338/195

[56] References Cited

U.S. PATENT DOCUMENTS

| | | | |
|---|---|---|---|
| 3,722,085 | 3/1973 | Caddock | 29/620 |
| 3,821,845 | 7/1974 | Hukee | 29/620 |
| 3,827,142 | 8/1974 | Bennett | 29/620 |
| 4,032,881 | 6/1977 | Singleton | 29/620 |

*Primary Examiner*—Bruce A. Reynolds
*Assistant Examiner*—Fred E. Bell
*Attorney, Agent, or Firm*—Richard D. Dixon

[57] ABSTRACT

This invention relates to an apparatus and method for adjusting the resistance value of an elongated resistance film of typically inconsistent density which has been deposited on an insulative substrate. The resistance incremental of this film is measured between a start point and a wiper point. This resistance is then compared with a specified resistance, and an error signal is generated responsive to any error between the measured resistance and the specified resistance. The error signal is used to regulate the relative motion between a laser beam and the resistance film, with the motion being generally transverse to a longitudinal axis of the resistance film. This motion causes the finely focused laser beam to burn an insulative separation path in the resistance film, thereby regulating the effective width of the resistance film. This regulation of the effective width progresses in a continuous manner over the entire length of the active portion of the resistive element.

23 Claims, 5 Drawing Figures

LASER RESISTANCE TRIMMER

BACKGROUND OF THE INVENTION

I Field of the invention

The present invention relates to a method and apparatus for adjusting the resistance value of an elongated resistance film of typically inconsistent density which has been deposited on an insulative substrate. More particularly, the present invention relates to a method and apparatus utilizing laser energy for trimming the effective width of generally arcuate potentiometer resistances.

II Description of the prior art

Advances in LSI thick-film and thin-film technology have produced a rapid increase in the demand for highly accurate and inexpensively produced trimming potentiometers. For many years it has been well within the state of the art to manufacture arcuate potentiometer resistances through the use of thick-film or thin-film techniques. However, the state of the art has not satisfactorily progressed to rapidly and economically produce a planar substrate having an arcuate resistance film deposited thereon and then accurately trim the effective width of this resistance film to produce a typically linearly tapered potentiometer resistance.

Using either thin-film or thick-film techniques, a resistive film having an accurately controlled width may be deposited upon the insulative substrate without significant difficulties. However, it is extremely difficult using the standard thick-film screening technology to accurately control the vertical thickness of the resistive ink, as well as to accurately control the density of the resistive ink deposited upon the substrate. Therefore, both the thickness and the density of the resistive ink can cause severe aberrations in the effective resistance as measured from a start point and progressing angularly along the resistance film.

The prior art teaches several different static methods for trimming a resistive film deposited upon an insulative substrate. However, the static trimming method generally cannot make the required allowances to compensate for variations in the thickness or the density of the resistive film. Ennis, in U.S. Pat. No. 3,916,142, discloses a static method of trimming a film-deposited resistor of an RC network used in a hydrid time-delay circuit. While this method is useful for its intended purpose, it cannot accurately compensate for variations in resistance film thickness and density as previously described, since no real time resistance sensor is used to monitor the resistance value during the trimming process. Schuermann, in U.S. Pat. No. 3,916,144 discloses a method utilizing a laser beam for adjusting the resistance of cylindrical layer resistors. The resistor is rotated about its longitudinal axis at a predetermined rotational speed, and a pulsating laser beam is moved at a predetermined linear speed along the line parallel to the longitudinal axis of the resistor element for etching insulative channels therebetween. Robinson, in U.S. Pat. No. 3,293,587, and Helgaland, in U.S. Pat. No. 3,530,573, disclose various methods for removing sections of the resistive film from cylindrical resistors for adjusting the total resistance of the element. Neither of these methods utilize a wiper element to sense in real time any aberrations in the incremental resistance of the cylindrical resistance element.

Dowley, in U.S. Pat. No. 3,750,049, discloses a tool utilizing a laser beam for accurately trimming the total resistive value of the resistance element. The resistance element is connected as one leg of a bridge circuit, and the trimming process is concluded when the direction of flow through the resistance-sensing amplifier reverses. This reference also discloses the use of a gas jet directed obliquely at the workpiece in the region of the intersection with the laser beam for removing debris and contaminents from the vicinity of the workpiece.

Other references which disclose methods for trimming resistances with laser or electromagnetic sources of energy include the following: Bennett in U.S. Pat. No. 3,842,495, Staudte in U.S. Pat. No. 3,766,616, Neale in U.S. Pat. No. 3,634,927, Lumley in U.S. Pat. No. 3,597,579, Robinson in U.S. Pat. No. 3,486,221 and Wolff in U.S. Pat. No. 3,448,405. While these references are pertinent to the prior art and serve as a background for this invention, none of these references disclose the use of a wiper element which provides a real time resistance feedback to accurately control the cutting path of the laser for compensating for variations in thickness and density of the resistive film deposited upon the insulative substrate.

SUMMARY OF THE INVENTION

The present invention is characterized by providing a simple method and apparatus for trimming the resistance value of an elongated resistance film of typically inconsistent density which has been deposited on an insulative substrate. The method comprises the steps of defining a start point and a plurality of wiper points spaced therefrom generally along a longitudinal axis of the resistance film. Next, the resistance of the resistance film is measured between the start point and one of the wiper points. A master resistance signal is then generated representative of a specified resistance between the start point and the wiper point. The master resistance signal is then compared to the measured resistance and an error signal is then used to control the transverse penetration of the laser beam into the resistance film for trimming the effective width of the resistance film to cancel the error between the resistance of the workpiece and the specified resistance. The wiper point is moved along the longitudinal axis of the resistance film in a direction away from the start point. Utilizing a plurality of new wiper points, the various resistance values, both measured and specified, are determined and the transverse location of the laser beam is then adjusted responsive to any error signal therebetween.

An apparatus in accordance with the present method is also disclosed and claimed herein.

BRIEF DESCRIPTION OF THE DRAWINGS

Other objects, features and advantages of the present invention will be apparent from a a study of the written description and the drawings in which.

DETAILED DESCRIPTION OF THE PREFERRED EMBODIMENT

In contrast to the prior art which discloses static resistance trimming devices and methods, the present invention measures the incremental resistance to be trimmed and derives an error signal by comparing this measured resistance with a resistance standard for the part to be manufactured. From this comparison an error signal is derived to change the position of a laser trimmer, thereby correcting for any irregularities in the resistance film. Therefore, the present invention may be termed as an active or feedback controlled trimming method and apparatus.

Figure 1:
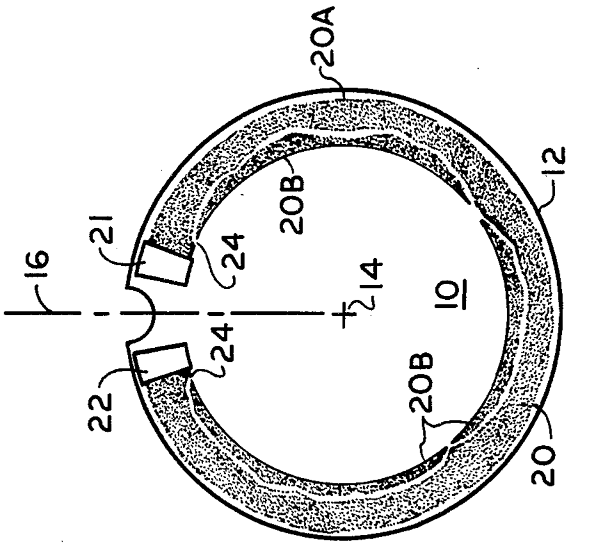
FIG. 1 illustrates a top plan view of an insulative substrate having deposited thereon a resistance film which has been trimmed in accordance with the method and apparatus disclosed herein.

A typical substrate workpiece of the type manufactured in accordance with the method and apparatus disclosed herein is shown generally as 10 in FIG. 1. A substrate 12 is formed of a generally insulative material such as alumina ceramic, plastic, mylar, etc. A generally arcuate resistance film 20 is deposited upon the substrate 12 in a manner symmetrical about a center 14. The resistance film 20 includes at a first end thereof a start terminal 21 and at a second end thereof a termination terminal 22 with a longitudinal axis being defined along the resistance film 20 therebetween. The start terminal 21 and the termination terminal 22 define immediately therebetween an open section of the resistance film 21 which is generally bisected by a reference or zero center line 16 which is used as a reference point for measuring the angular registration of the workpiece 10 about the center 14. The resistance film 20 between the start terminal 21 and the termination terminal 22 is typically of inconsistent density and thickness, as well as possibly having therein a plurality of small but measurable cracks, bubbles or other surface irregularities which cause aberrations in the incremental resistance of the film 20. It is therefore necessary to actively adjust the width of the resistance film 20 typically along the entire longitudinal axis or longitudinal direction thereof in order to compensate for these surface irregularities.

In accordance with the method and apparatus of the present invention, a laser beam is utilized to cut through the resistance film 20 adjacent an inside circumference thereof for defining an insulative channel 24 which separates an outer circumferential resistance film section 20*a* and an inner circumferential resistance film section 20*b*. Since the inner circumferential resistance film 20*b* is electrically separated from the outer circumferential resistance film 20*a*, it does not add as a resistance in parallel between the start terminal 21 and the termination terminal 22.

It should be noted at this point that the width of the insulative channel 24 created by the incidence of the laser beam upon the resistance film 20 has been greatly exaggerated in FIG. 1 for the sake of clarity. Normally the width of the channel 24 is approximately 0.001 to 0.002 inches as compared to the typical width of the resistance film 20 of approximately 0.030 to 0.100 inches. If the resistance film 20 has been deposited by a thick-film or silkscreen process, the resistance film 20 is approximately 0.001 to 0.005 inches thick. On the other hand, if thin-film vapor deposition techniques have been used to deposit the resistance film 20 upon the substrate 12, the thickness of the resistance film 20 is typically in the order of less than one ten-thousandth of an inch. In view of the relatively small thickness of the resistance film 20 and the length as measured generally along a longitudinally or circumferential axis which communicates between the start terminal 21 and the termination terminal 22, the conductive resistance of the resistance film 20 may be varied over a wide range typically between 0 to 100 Ohms and 0 to 1 MegOhm.

Figure 3:
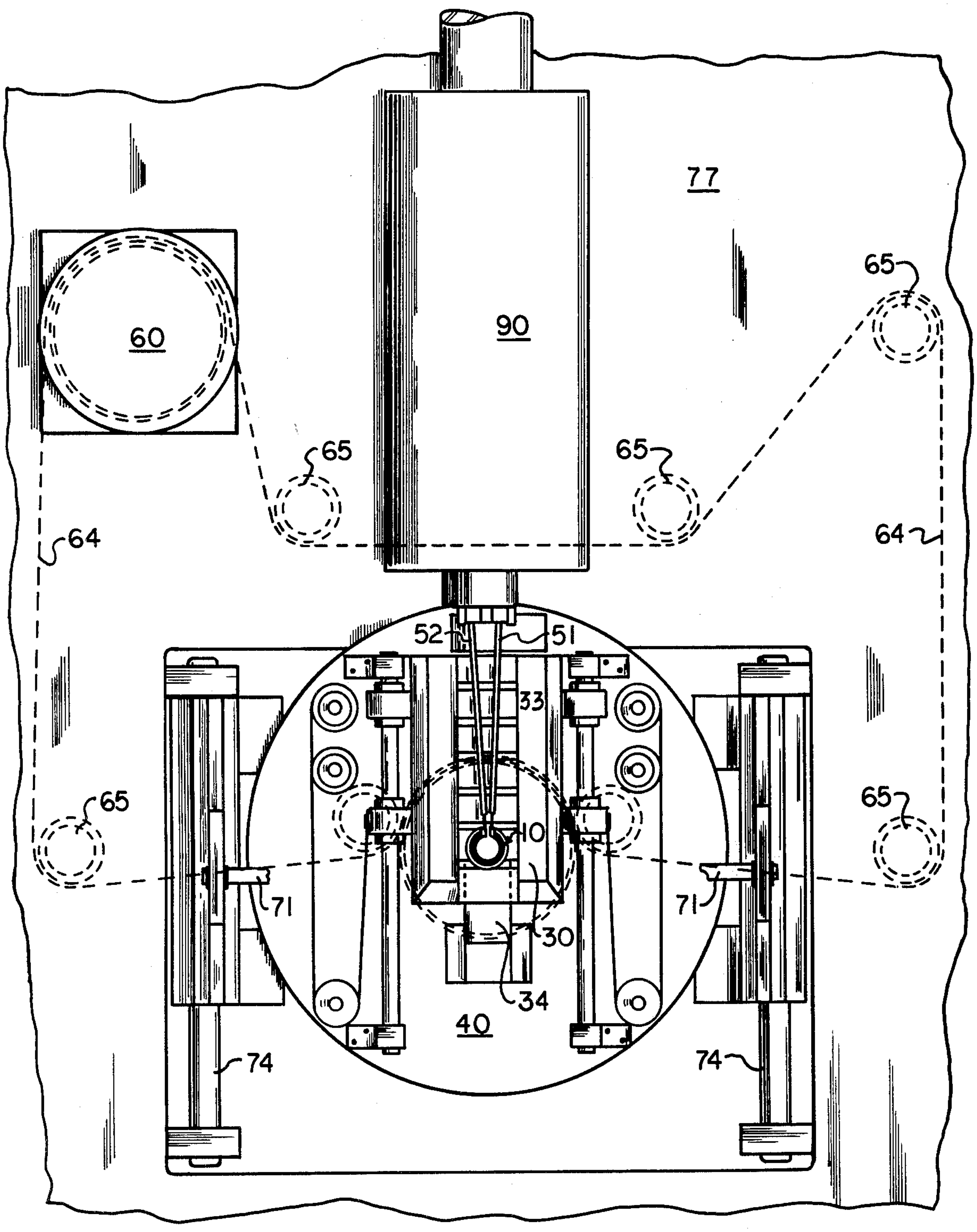
FIG. 3 illustrates a top plan view of a first preferred embodiment of an apparatus in accordance with the present invention.

With reference to FIG. 3, a plurality of workpieces 10 (only one has been shown for the sake of clarity) are typically removably coupled to a removable loadstick 30. In turn, the loadstick 30 is movable coupled to a first turntable 40 which rotates generally about an axis which is concurrent with the center 14 of the workpiece 10 upon which the present apparatus is operating. The workpiece 10 is positioned such that a first probe 51 will electrically and removably communicate with the start terminal 21 of the resistance film 20 and such that a second probe 52 will electrically and removably communicate with the termination terminal 22 of the workpiece 10. The first probe 51 and the second probe 52 are coupled to the turntable 40 for rotating integrally therewith. In this manner the total electrical resistance of the resistance film 20 can be measured between the first probe 51 and the second probe 52 regardless of the angular position of the first turntable 40.

Figure 4:
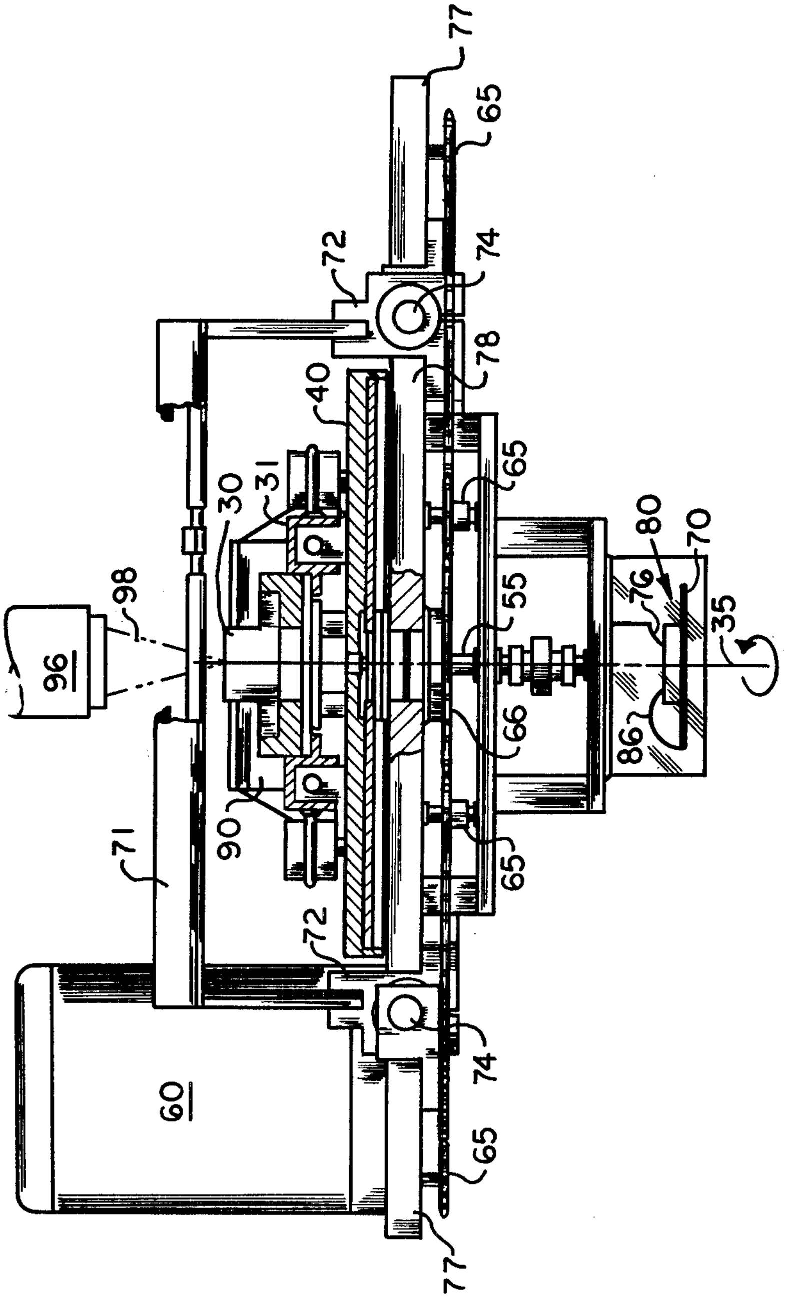
FIG. 4 illustrates a front plan view of a first preferred embodiment of an apparatus in accordance with the present invention.

As illustrated in FIGS. 3 and 4, the loadstick 30 is movably coupled to an upper carriage 31, which in turn is coupled to the first turntable 40. A lower surface of the loadstick 30 includes therein a plurality of grooves 33 for being engaged by a pawl 34 for fixing the relative position of the workpiece 10 with respect to the rotational axis 35 of the first turntable 40. The first turntable 40 is rotated about its axis 35 by the operation of a stepping motor 60 which drives a micropitch chain 64 through a plurality of idler sprockets 65 to drive a driven sprocket 66. The driven sprocket 66 is coupled to a central shaft 55 which defines coaxially therein the rotational axis 35 of the first turntable 40.

A second turntable 70 is located adjacent a second or lower end of the central shaft 55 for rotating in registration with the first turntable 40. Upon the second platter is placed a master or ideal workpiece 80 similar to the type being manufa-tured. This master workpiece 80 includes a substrate 82 having thereon a master resistance film 85 which is generally similar in appearance to the resistance film 20 of the workpiece 10 as illustrated in FIG. 1. The rotational center of the master workpiece 80 is located generally coincident with the roational axis 35 of the central shaft 55. A first master probe 86 electrically couples with a start terminal of the master workpiece 80 in a manner similar to the first turntable 40 as illustrated in FIG. 1. The first probe 51 is in angular registration with the first master probe 86, and the start terminal 21 of the workpiece 10 is in angular registration with the similar start terminal of the master workpiece 80. Therefore, the angular rotation of the workpiece 10 will be transmitted through the central shaft 55 to cause a corresponding angular rotation of the master workpiece 80.

Figure 5:
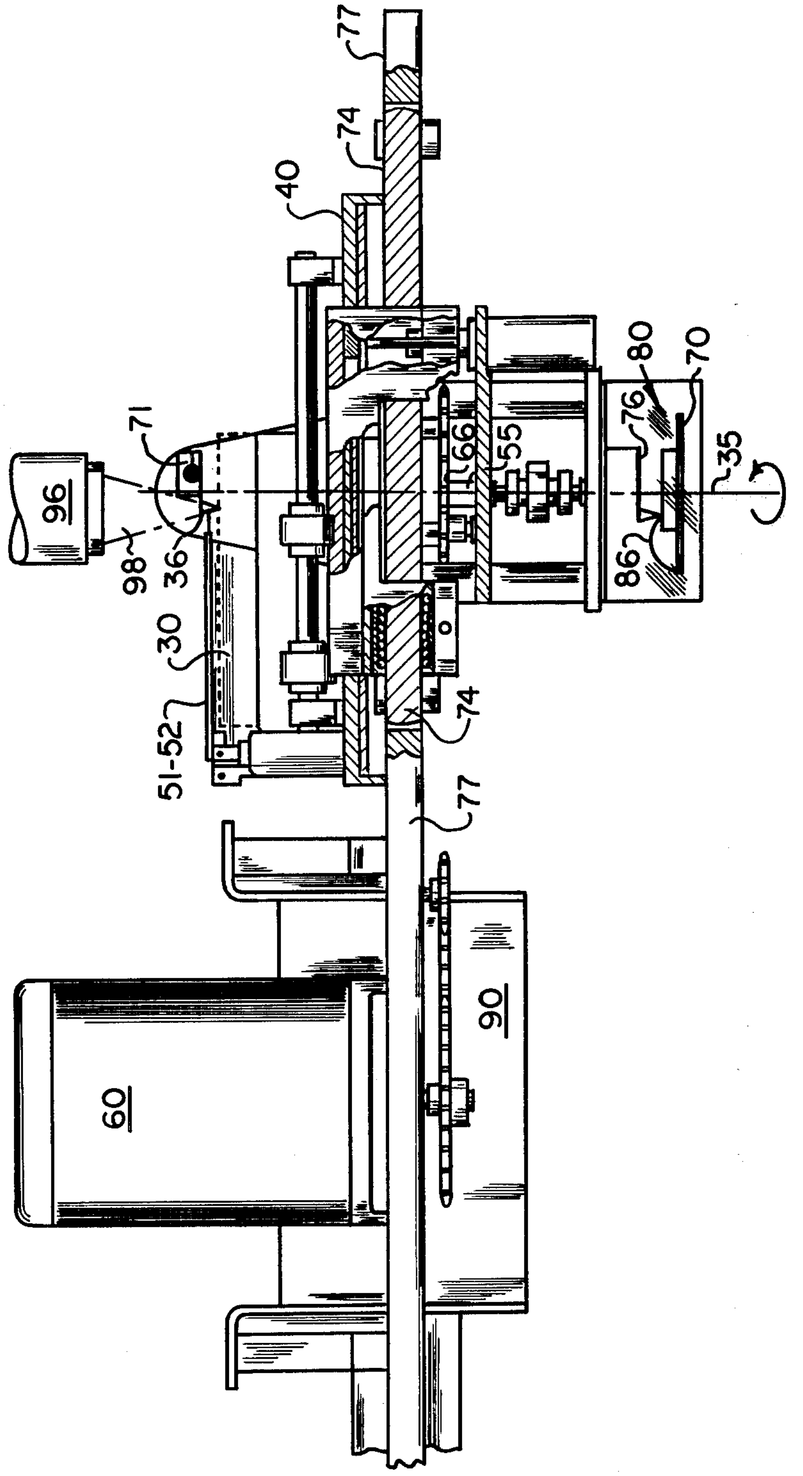
FIG. 5 illustrates a side plan view of a first preferred embodiment of an apparatus in accordance with the present invention.

As illustrated in FIGS. 4 and 5, a crossbar 71 communicates over the loadstick 30 and remains stationary as the workpiece 10 rotates with the first turntable 40. The crossbar 71 is coupled at either end thereof to paired base plate bearing structures 72 which slide along paired main carriage guide shafts 74 coupled to a main frame 77. A main base plate 78 communicates between the paired base plate bearing structures 72 for allowing the first turntable 40, the central shaft 55, the loadstick 30 and the second turntable 70 to move laterally along the main carriage guide shafts 74. This lateral or transverse movement is controlled by an electro-proportional bi-directional solenoid 90 coupled between the base plate 78 and the main frame 77.

A laser 96 is coupled in fixed registration to the main frame 77 for having the laser beam 98 incident upon the workpiece 10 at a point which falls generally along the center zero line 16 as shown in FIG. 1. In this manner the transverse motion of the base plate 78 caused by the electro-proportional or analog solenoid 90 causes the laser beam 98 to move radially inward or outward from the center 14 of the substrate 12. Therefore, as the substrate 12 is rotated upon the first turntable 40 the laser beam 98 will trace a circumference of controlled radius as required to form the insulative channel 24 in the resistance film 20.

As illustrated in FIGS. 4 and 5, a first wiper 36 is coupled to the crossbar 71 so as to make electrical contact with the resistance film 20 of the workpiece 10 at a point generally adjacent to the zero center line 16, (as shown in FIG. 1) but spaced incrementally clockwise therefrom. In this manner, as the workpiece 10 is rotated substantially in a counter-clockwise direction as viewed in FIG. 1, the wiper terminal 36 will be in a position to measure the section of the resistance film 20 between the start terminal 21 and the zero center line 16. Since the laser beam 98 is immediately adjacent to but spaced slightly counter-clockwise from the wiper 36 (as viewed in FIG. 1), the wiper 36 will be in communication with and will measure the segment of the outer circumferential resistance film 20*a* between the start terminal 21 and the zero center line 16.

In a similar manner, a master wiper 76 communicates with the master resistance film 85 located on the master workpiece 80. The master wiper 76 is in precise angular registration with the wiper 36 so that the portion of the master resistance film 85 which is included between the master wiper 76 and the first master probe 86 will be precisely equal to and in precise registration with the section of the resistance film 20 of the workpiece 10 which is included between the wiper 36 and the first probe 51. Since the master workpiece 80 and the workpiece 10 are in precise angular registration, and since the wiper 36 and the master wiper 76 are in precise registration, and since the first probe 51 and the first master probe 86 are in prescise registration, the master resistance film 85 on the master workpiece 80 may be used as an ideal or model resistance for the workpiece 10 being manufactured.

Figure 2:
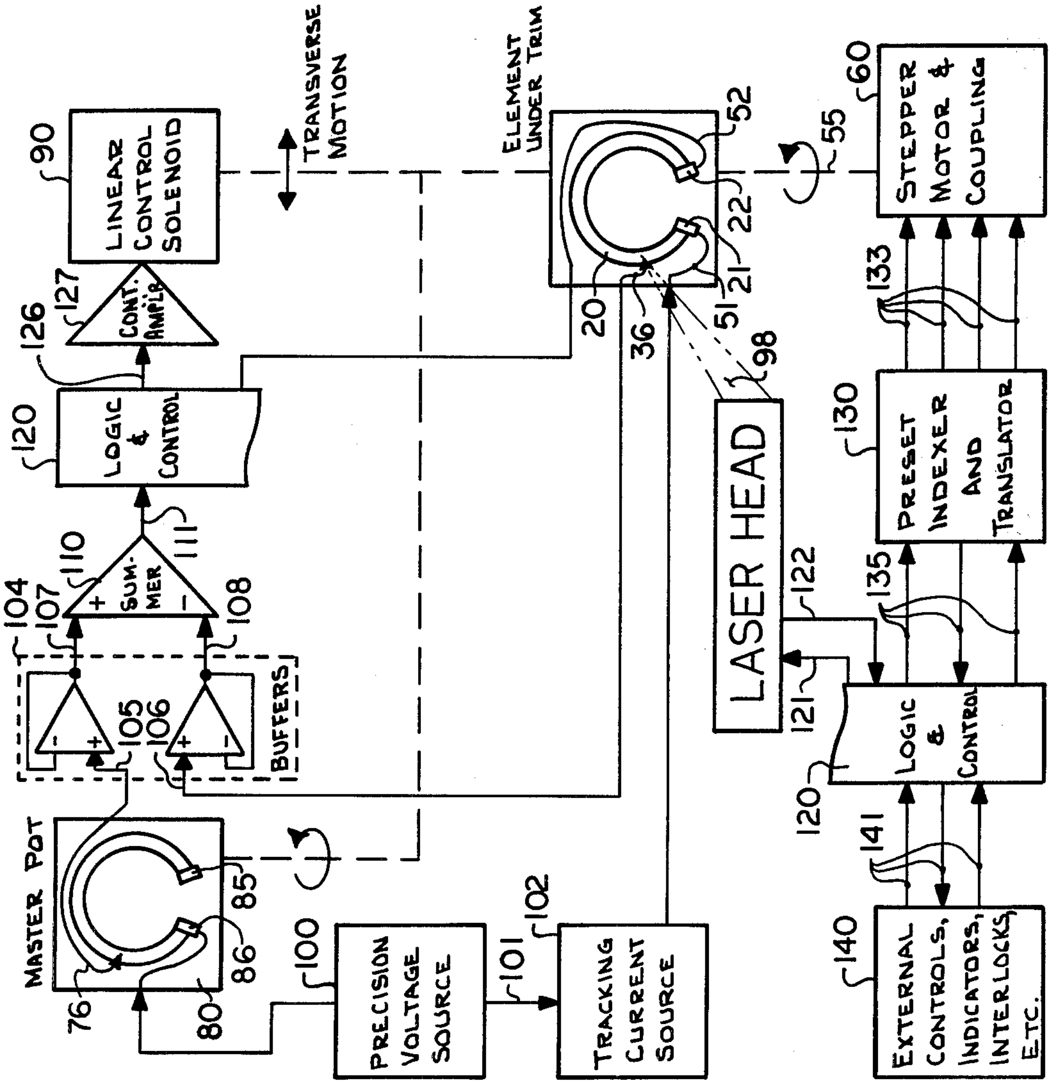
FIG. 2 illustrates a schematic block diagram of the apparatus and method in accordance with the present invention.

An electrical schematic block diagram in accordance with the present invention is illustrated in FIG. 2. A precision voltage source 100 is coupled by circuit element 101 to a network 102 for converting the constant voltage to a constant current source 102. The output of the constant current source 102 is fed through a circuit element to the first probe 51 which is in electrical communication with the start terminal 21 of the workpiece 10.

A second constant voltage output from the precision voltage source 100 is coupled through an electrical conductor to the first master probe 86 which is in electrical communication with the start terminal on the master resistance film 85 of the master workpiece 80.

A high-impedance buffer amplifier, shown generally as 104, includes a first input 105 which is coupled to the master wiper 76 which is in electrical communication with the master resistance film 85. A second input 106 of the high-impedance buffer amplifier 104 is coupled through a circuit element to the wiper 36 which is in electrical communication with the outer circumferential resistance film 20*a* of the workpiece 10.

A first output 107 of the high-impedance buffer amplifier 104 is coupled to a first input of a summing amplifier or error-detector 110. A second output 108 of the high-impedance buffer amplifier 104 is coupled to a second input of the error-detector 110. The error-detector 110 compares the voltage differential between the first input 107 and the second input 108 and generates, at an output 111 thereof, an error sigal representative, in magnitude and polarity, of the differential between the voltages present at the two inputs 107 and 108 thereof.

The resistance error signal at the output 111 of the summing amplifier 110 is coupled by a circuit element to the input of the logic and control circuitry, shown generally as 120. The logic circuitry analyzes the magnitude and polarity of the resistance error signal and compares these factors with predetermined error limits. If the magnitude of the error signal exceeds a predetermined maximum limit, or a predetermined minimum limit, then the logic circuitry 120 disables the Q switch of the laser 96 through the circuit elements 121 and 122. The logic circuitry 120 is also utilized to disable the output of the laser 96 until all safety interlocks have been actuated and until the wiper 36 clears the start terminal 21 of the workpiece 10.

Assuming that all of the safety interlock conditions and the resistance error limits have been satisfied, the logic circuitry 120 passes the error signal from an output 126 thereof through a circuit conductor to the input of a control amplifier 127 which converts the magnitude and polarity of the resistance error signal into a voltage command for actuating the linear control solenoid 90. In this manner, the transverse motion of the baseplate 78, the first turntable 40, the loadstick 30 and the workpiece 10 are moved as a unit responsive to the error signal detected by comparing the actual resistance measured along the resistance film 20 of the workpiece 10 with the specified resistance as measured along the same angular section of the master resistance film 85 of the master workpiece 80. In the first preferred embodiment it is anticipated that a transverse deflection of 100 mills will be sufficient to correct for 85% of the typical surface aberations in the resistance film 20.

The laser 96 typically comprises a Nd:YAG laser having a Q switch electrically actuated by voltages transmitted along the circuit lines 121 and 122 from the logic control circuitry 120. The laser beam output 98 of the laser 96 is focused through typical optical lenses to a very small point which is generally incident upon the workpiece 10 at a point generally within the width of the resistance film 20 and immediately adjacent the wiper 36. This laser contact point typically moves along the center zero line 16.

The workpiece 10 is coupled to the first turntable 40, which in turn is coupled through the central shaft 55 to the stepping motor 60. The stepping motor 60 typically comprises a motor having 200 steps per revolution. A 34–50 gear reduction system is used to transform one step of the stepping motor 60 into a one-degree rotation of the workpiece 10 with reference to the stationary center zero center line 16 as illustrated in FIG. 1. The stepping motor 60 is electrically driven by a pre-set indexer and translator 130 coupled thereto by a plurality of circuit lines 133.

The output of an integral timing circuit included within the logic circuitry 120 is fed through the circuit element 135 to the input of the preset indexer and translator for periodically incrementing the motion of the stepping motor 60. This timing circuitry is disabled by the presence of an open safety interlock switch for preventing the actuation of the stepping motor 60 without all safety conditions being satisfied. The preset indexer and translator 130 may be pre-programmed to provide varying accelerations during the first preset number of degrees and the last preset number of degrees of angular motion. These presets generally correspond to the angular increment between the initial zero center line 16 and the beginning of the resistance film 20 (therefore skipping the start terminal 21) and the angular separation between the initial center zero line 16 and the end of the resistance film 20 (therefore skipping the termination terminal 22).

The timing circuitry and the preset indexer and translator may also be disabled when the logic circuitry 120 senses that the total resistance of the resistance film 20, as measured between the first probe 51 and the second probe 52, deviates from within specified nominal limits. The logic circuitry 120 may also be used to control the presence of a gaseous blast aimed toward the workpiece 10 at a point generally coincident with the point of contact of the laser beam 98 thereupon.

The operation of the apparatus which has been described as a first preferred embodiment of the present invention will now be described in accordance with the method as disclosed herein.

First, the workpiece 10 is advanced into the operating position such that the center 14 thereof is generally coincident with the rotational axis 35. The first probe 51 is then lowered into electrical contact with the start terminal 21 and simultaneously the second probe 52 is lowered into electrical contact with the termination terminal 22. The logic circuitry 120 then measures the total resistance of the untrimmed resistance film 20 therebetween. If this total resistance lies between the required perameters, the stepping motor 60 is actuated to proceed for a preset number of degrees of angular rotation, at which time the wiper 36 is lowered into communication with the resistance film 20.

As the stepping motor 60 continues its incremental rotation of the workpiece 10 and the master workpiece 80, the resistance as measured between the first probe 51 and the wiper 36 along the resistance film 20 is compared with the resistance between the master wiper 76 and the first master probe 86 as measured along the master resistance film 85. The error-signal derived by the summing amplifier 110 therefore represents the difference between the incremental resistance of the workpiece 10 and the incremental resistance of the master workpiece 80. The error signal thus derived is used to actuate the linear solenoid 90 which moves the turntable 40, the loadstick 30 and the workpiece 10 generally in a direction transverse to the circumferential or longitudinal axis defined by the elongated resistance film 20. In this manner, the incremental resistance of the resistance film 20 is adjusted using the master workpiece 80 as a reference to be duplicated. As the stepping motor 60 angularly advances the workpiece about the center 14, each succeeding resistance interval is also adjusted in a similar manner.

As the logic circuitry 120 senses that the laser beam 98 is immediately adjacent to the termination terminal 22, the logic circuitry 120 will disable the laser 96 and lift the wiper 36, the first probe 51 and the second probe 52. The stepping motor 60 will then return the workpiece 10 to its original position with reference to the zero center line 16. The next workpiece 10 will then be advanced into the working position as illustrated in FIG. 3 by the operation of the movable loadstick 30.

Thus, a first preferred embodiment of the apparatus in accordance with the method of the present invention has been illustrated as an example of the invention as claimed. However, the present invention should not be limited in its application to the details illustrated in the accompanying drawings or the specification, since this invention may be practiced and constructed in a variety of different embodiments without departing from the scope and spirit of the appended apparatus and method claims. Also, it must be understood that the terminology and descriptions employed herein are used solely for the purpose of describing the general operation of the preferred embodiment and therefore should not be construed as limitations on the operability of the invention.

I claim:

1. A method for adjusting the resistance value of an elongated resistance film of typically inconsistent density which has been deposited upon an insulative substrate workpiece, said method comprising the steps of:

(a) defining along a longitudinal axis of the resistance film a start point and a movable wiper point;

(b) measuring the resistance along the resistance film between said start point and said wiper point;

(c) generating a master resistance signal representative of a specified resistance along the resistance film between said start point and said wiper point;

(d) comparing said measured resistance with said master resistance signal and generating an error signal responsive to the differences therebetween;

(e) trimming the effective width of the resistance film in a direction generally transverse to said longitudinal axis responsive to said error signal, thereby reducing the difference between said measured resistance and said master resistance signal;

(f) moving said wiper point generally along said longitudinal axis while trimming, thereby increasing the effective separation between said start point and said wiper point while trimming the effective width of the resistance film; and (g) repeating steps (b) through (g).

2. The resistance-trimming method as described in claim 1 wherein step (e) comprises the substeps of:

(e-1) generating a high-intensity laser beam capable of cutting through the resistance film, thereby creating a generally continuous insulative path between the juxtaposed sections of the resistance film; and (e-2) regulating the transverse relative motion between said laser beam and the resistance film for trimming the effective width of the resistance film responsive to said error signal.

3. The resistance-trimming method as described in claim 2 wherein step (e) comprises the additional substep of:

(e-3) maintaining the point of contact of said laser beam with the resistance film generally adjacent to said wiper point.

4. The resistance-trimming method as described in claim 3 wherein step (f) includes the substep of:

(f-1) increasing the effective separation between said start point and said wiper point by a known incremental distance, generally along said longitudinal axis of the resistance film.

5. The resistance-trimming method as described in claim 3 wherein step (c) comprises the substeps of:

(c-1) defining a master start point and a movable master wiper point generally along a longitudinal axis of a master resistance film; and (c-2) measuring the resistance along said master resistance film between said master start point and said master wiper point, and generating said master resistance signal representative thereof.

6. The resistance trimming method as described in claim 5 wherein step (f) includes the substep of:

(f-2) increasing the effective separation between said master start point and said master wiper point by a known incremental distance, longitudinally along said master resistance film.

7. The resistance trimming method as described in claim 5 wherein step (c) includes the further substep of:

(c-3) orienting said master start point and said master wiper point of said master resistance film in respective registration with said start point and said wiper point of the resistance film.

8. The resistance trimming method as described in claim 7 wherein the resistance film and said master resistance film are generally arcuate in shape for defining centers of rotation therein;

and wherein step (e-3) comprises the additional substep of coupling said arcuate resistance film and said arcuate master resistance film in angular registration to a common shaft, and rotating said shaft in angular increments for increasing the spacing between said start point and said wiper point.

9. The method as described in claim 3 wherein step (d) includes the substep of rejecting as defective the resistance film responsive to said error signal deviating outside of an error-limit interval.

10. The resistance trimming method as described in claim 3 wherein step (a) further comprises the substeps of:

(a-1) defining said start point at one end of the resistance film and defining a termination point at the opposite end of the resistance film;

(a-2) measuring the total resistance of the resistance film between said start point and said termination point; and (a-3) rejecting as defective the resistance film if said total resistance falls outside of a total resistance interval.

11. The resistance trimming method as described in claim 10 further comprising the additional step of blowing a gas across the resistance film adjacent said wiper point and said point of contact of said laser beam for removing contaminate matter therefrom.

12. An apparatus for trimming the resistance value of an elongated resistance film of typically inconsistent density which has been deposited upon an insulative workpiece, said apparatus comprising in combination:

a first probe for being electrically coupled to a start terminal defined at one end of the resistance film;

a movable wiper for electrically communicating generally along a longitudinal axis of the resistance film;

first resistance means having inputs coupled to said wiper and to said first probe for measuring the resistance of said resistance film therebetween and generating a first resistance signal representative thereof;

first motive means coupled between the resistance film and said wiper for moving said wiper generally along said longitudinal axis of the resistance film in known registration with said start terminal;

master resistance means coupled to said first motive means for generating a master resistance signal responsive to the relative registration between said start terminal and said wiper, with said master resistance signal being representative of a specified resistance along the resistance film between said start terminal and said wiper;

comparator means coupled to said first resistance means and said master resistance means for comparing said first resistance signal and said master resistance signal, and generating a resistance error signal responsive to the difference therebetween;

a laser for generating a laser beam incident upon said workpiece movably adjacent to said wiper for cutting through the resistance film, thereby creating an insulative path between the juxtaposed sections of the resistance film; and transverse motion means electrically coupled to said comparator means for receiving said resistance error signal and responsive thereto regulating the relative transverse motion between said laser beam and said resistance film, whereby the width and therefore the longitudinal resistance profile of the resistance film is adjusted to equal a specified longitudinal resistance profile.

13. The resistance trimming apparatus as described in claim 12 further comprising:

error-limit means interposed between said comparator means and said transverse motion means for disabling said transverse motion means responsive to said resistance error signal deviating outside allowable upper and lower resistance error limits.

14. The resistance trimming apparatus as described in claim 12 further comprising:

a second probe for being electrically coupled to a termination terminal defined at a second end of the resistance film;

second resistance means having inputs coupled to said first probe and said second probe for measuring the resistance of the resistance film therebetween and generating a second resistance signal responsive thereto; and defect detector means operably coupled to said second resistance means for disabling said transverse motion means responsive to said second resistance signal deviating outside allowable upper and lower total resistance error limits.

15. The resistance trimming apparatus as described in claim 14 wherein said master resistance means comprises in combination:

an elongated master resistance film having a master start terminal at one end thereof;

a movable master wiper for electrically communicating generally along a longitudinal axis of said master resistance film;

second resistance means having inputs coupled between said master start terminal and said master wiper for measuring the resistance therebetween and generating said master resistance signal representative thereof; and master coupling means for maintaining relative registration between said start terminal and said master start terminal as well as between said wiper and said master wiper as said wiper communicates along the resistance film.

16. The resistance trimming apparatus as described in claim 15 wherein the resistance film and said master resistance film each have a generally arcuate shape defining an open circumference about a center point and wherein said master coupling means comprises a coupling shaft defining an axis of rotation therethrough, with the resistance film and said master resistance film coupled about said centers thereof to said coupling shaft for being simultaneiously rotated about said axis of rotation.

17. The resistance trimming apparatus as described in claim 16 wherein said first motive means comprises a stepper motor for incrementally moving said wiper along said longitudinal axis of the resistance film.

18. A method for trimming the resistance value of an elongated resistance film deposited upon a substrate workpiece, said method comprising the steps of:

(a) defining along a longitudinal direction of the resistance film a start point and a movable wiper point;

(b) measuring the resistance along the resistance film between said start point and said wiper point;

(c) generating a master resistance signal representative of a specified resistance along the resistance film between said start point and said wiper point;

(d) comparing said measured resistance with said master resistance signal and generating an error signal responsive to the differences therebetween;

(e) generating a high-intensity laser beam capable of cutting through the resistance film generally adjacent to said wiper point, thereby creating a generally continuous insulative path between the juxtaposed sections of the resistance film;

(f) moving said wiper point and said laser beam generally along said longitudinal direction for simultaneously trimming the effective width of the resistance film in a direction generally transverse to said longitudinal direction responsive to said error signal, thereby reducing the difference between said measured resistance and said master resistance signal;

(g) repeating steps (b) through (g).

19. The resistance-trimming method as described in claim 18 wherein step (c) comprises the substeps of:

(c1) defining a master start point and a movable master wiper point generally along a longitudinal axis of a master resistance film; and (c2) measuring the resistance along said master resistance film between said master start point and said master wiper point, and generating said master resistance signal representative thereof.

20. The resistance-trimming method as described in claim 19 wherein the resistance film and said master resistance film are generally arcuate in shape for defining centers of rotation therein; and wherein step (f) comprises the additional substep of:

coupling said arcuate resistance film and said arcuate master resistance film in angular registration to a common shaft such that said master start point and said master wiper point of said master resistance film are in respective registration with said start point and said wiper point of the resistance film, and then rotating said shaft in angular increments for increasing in fixed registration the spacings between said start point and said wiper point and between said master start point and said master wiper point.

21. An apparatus for trimming the resistance of an elongated resistance film deposited upon an insulative workpiece, said apparatus comprising in combination;

a first probe for being electrically coupled to a start terminal defined along the resistance film;

a movable wiper for electrically communicating generally along the length of the resistance film;

first resistance means having inputs coupled to said wiper and to said first probe for measuring the resistance fo said resistance film therebetween and generating a first resistance signal representative thereof;

cutting means for generating a cutting beam incident upon said workpiece for cutting through the resistance film, thereby creating a generally continuous insulative path between the juxtaposed sections of the resistance film;

first motive means coupled to the resistance film, to said cutting means, and to said wiper for moving said wiper and said cutting beam generally along the length of the resistance film in known registration with said start terminal;

master resistance means coupled to said first motive means for generating a master resistance signal representative of the relative registration between said start terminal and said wiper, with said master resistance signal being representative of a specified resistance along the resistance film between said start terminal and said wiper;

comparator means coupled to said first resistance means and said master resistance means for comparing said first resistance signal and said master resistance signal, and generating a resistance error signal responsive to the differences therebetween; and transverse motion means electrically coupled to said comparator means for receiving said resistance error signal and responsive thereto regulating the relative transverse motion between said cutting beam and said resistance film as said cutting beam moves generally along the length of said resistance film, whereby the width and therefore the longitudinal resistance profile of the resistance film is corrected.

22. The resistance trimming apparatus as described in claim 21 wherein said master resistance means comprises in combination:

an elongated master resistance film having a master start terminal adjacent one end thereof;

a movable master wiper for electrically communicating generally along the length of said master resistance film;

second resistance means having inputs coupled between said master start terminal and said master wiper for measuring the resistance therebetween and generating said master resistance signal representative thereof; and master coupling means for maintaining relative registration between said start terminal and said master start terminal and between said wiper and said master wiper as said wiper communicates along the length of the resistance film.

23. The resistance trimming apparatus as described in claim 22 wherein the resistance film and said master resistance film each have a generally arcuate shape defining an open circumference about a center point and wherein said master coupling means comprises a coupling shaft defining an axis of rotation therethrough, with the resistance film and said master resistance film coupled about said centers thereof to said coupling shaft for being simultaneously rotated about said axis of rotation.

* * * * *